Sept. 16, 1924.

J. W. WHITE

ADJUSTABLE BRAKE BAND SUPPORT

Filed Dec. 1, 1920

1,508,737

Witness

Inventor
John W. White
By his Attorneys

Patented Sept. 16, 1924.

1,508,737

UNITED STATES PATENT OFFICE.

JOHN W. WHITE, OF DETROIT, MICHIGAN, ASSIGNOR TO GENERAL MOTORS CORPORATION, OF DETROIT, MICHIGAN, A CORPORATION OF DELAWARE.

ADJUSTABLE BRAKE-BAND SUPPORT.

Application filed December 1, 1920. Serial No. 427,599.

*To all whom it may concern:*

Be it known that I, JOHN W. WHITE, a citizen of the United States, and a resident of Detroit, county of Wayne, and State of Michigan, have invented certain new and useful Improvements in Adjustable Brake-Band Supports, of which the following is a full, clear, concise, and exact description, such as will enable others skilled in the art to which the invention relates to make and use the same, reference being made therein to the accompanying drawings, which form a part of this specification.

My invention relates to brake mechanism designed for use with automobiles, motor trucks, and similar self-propelled vehicles and wherein a brake band is forced into frictional engagement with a brake drum to accomplish the braking; and the principal object thereof is to provide brake mechanism in which improved means are provided for adjusting the brake band employed in such brake mechanisms relative to the brake drum with which it co-operates, the invention being particularly applicable to internal brake bands altho certain features thereof are capable of use with brake bands designed to co-operate with the exterior surface of a brake drum.

Other objects of my invention will appear from the following description which, in connection with the accompanying drawing, forms a specification of my invention; it being appreciated, however, that the invention is capable of various modification and variation so long as such variations and modifications come within the scope of the concluding claims wherein the distinguishing features of my invention are particularly pointed out.

Referring now to the drawing.

Figure 1:
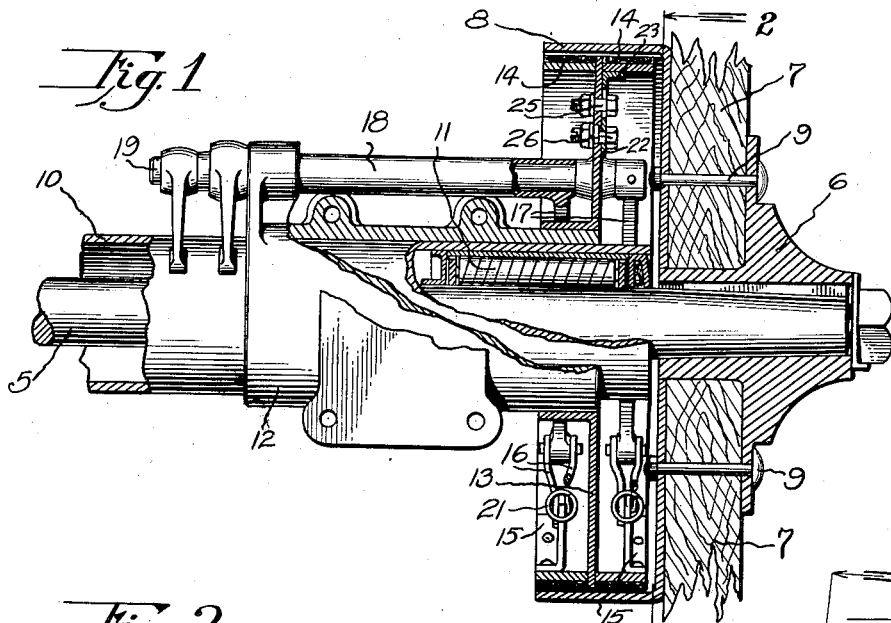
Figure 1 is a fragmentary view showing my improved brake mechanism partly in section and partly in elevation.

In the drawing the reference numeral 5 designates the outer portion of a rear driving axle to the outer end of which a hub 6 is secured from which the spokes 7 of the wheel extend; and the reference numeral 8 designates a brake drum secured to the wheel and partaking of the rotation thereof, as by means of suitable bolts 9.

The axle 5 extends through a hollow rear axle housing 10 and the end thereof is supported from said housing through a suitable roller or other bearing 11. This axle housing carries at its outer end a spring and brake supporting barrel 12 having a radially extending brake supporting member 13 in the form of a disc or plate which lies within the brake drum 8, and which is supported in a stationary or non-rotatable manner with reference to the said brake drum.

Located within the brake drum 8 is an expansible brake band made up of an inner strip of metal to the outer surface of which a suitable brake lining of asbestos or other non-metallic material is secured, both said portions being herein referred to as a brake band and both being designated by the reference numeral 14. Preferably two such brake bands are arranged one upon each side of the non-rotatable member 13, one being used for ordinary service braking and the other for emergency braking as is usual in motor driven vehicles.

The brake bands 14 illustrated herein are of the type commonly designated as the full-floating type wherein there is no permanent connection between any portion of the brake band and the stationary member whereby it is supported. The ends of each brake band are provided with brackets 15, which are pushed apart from one another to thereby force the brake band into contact with the interior of the brake drum by means of toggle levers 16; which levers in turn are operated as regards each band by an arm 17; altho any suitable brake applying mechanism may be employed as my invention is in no way limited to the brake applying features of the vehicle. In the form of my invention shown, however, the barrel 12 serves as a support for a hollow oscillating shaft 18 and for a solid shaft 19 enclosed by said hollow shaft; the outer ends of said shafts being provided with suitable arms 17 which are operatively connected with the links 16 of the two brake bands, while the inner ends of said shafts are provided with arms with which suitable brake applying rods are connected, the brake applying mechanism above referred to being best shown in Figure 1. The brake bands 14 are prevented from rotating with the drum when the brakes are applied by means of abutments which fit in between the ends of the bands and which absorb the thrust due to the application of the brakes and transmit the same to the stationary supporting member 13, one of said abutments being indicated by the reference numeral 20 in Figure 2 and the same being fixedly secured to the supporting member in any way. A spring 21 acts between the free ends of each brake band to hold said ends in contact with the abutment 20 and the brake band out of contact with the brake drum when the brake is not in use.

Figure 4:
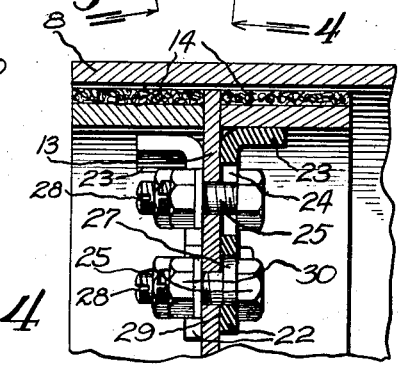
Figure 4 is a fragmentary view upon the same scale as Figure 3 and showing a section upon a plane indicated by the line 4—4 in said figure.

Secured to the non-rotatable supporting member 13 adjacent the periphery thereof are a plurality of stops 22, the particular number of stops employed being of secondary importance and depending upon the service required of the brakes or upon other features thereof. The stops are shown as right angular in form and the outer bent over portions 23 thereof extend beneath the brake bands 14 and serve to limit the inward movement of said bands which is produced by the springs 21 extending between the brackets 15 when the brakes are in their off position. These stops are adjustable, in order that the space between the periphery of the brake band and the interior of the brake drum may be adjusted to secure proper action of the brakes initially, and to maintain the brakes in proper condition as the brake bands wear in use, to which end each of said stops is provided with a longitudinally extending slot 24; and bolts 25, one for each stop, extend through holes in the supporting member 13 and through the slots in the stops, as best shown in Figure 4, to thereby clamp the stops against the supporting member in whatever position they may be adjusted into.

The means illustrated for effecting the adjustment of each stop 22 comprises a rotary combined securing and cam member adapted to move said stop radially, and to also assist in holding it in its adjusted position; said members being in the form of bolts 26 having each an eccentric cam or collar 27 just beneath the head thereof, and the extremity of the threaded shank of which is provided with a holding slot 28.

Figure 2:
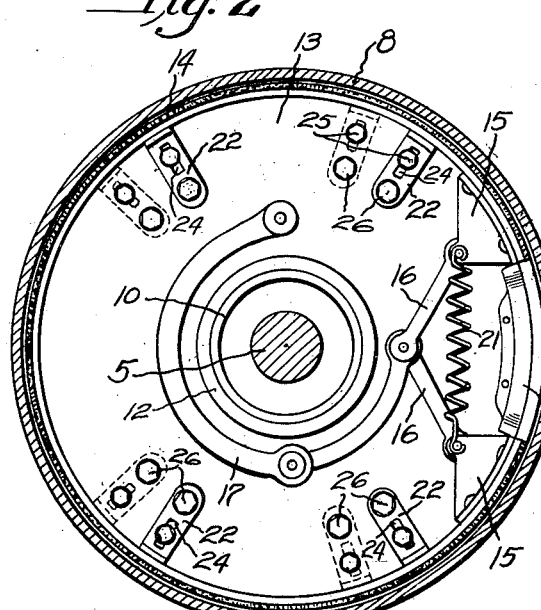
Figure 2 is a view showing a section on a vertical plane indicated by the line 2—2, Figure 1, at right angles to the vehicle axle.
Figure 3:
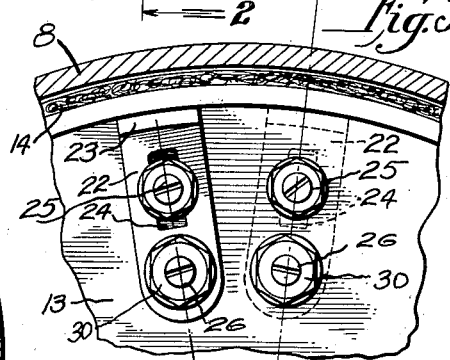
Figure 3 is a fragmentary view showing certain features of my invention upon an enlarged scale.

The heads of the clamping bolts 25 and the adjusting bolts 26 are all arranged between the supporting member or plate 13 and the adjacent inner wall of the brake drum which is secured to the wheel, so as to leave the ends of the threaded shanks of the bolts and the nuts thereupon exposed at the open side of the brake drum, as will be understood from Figures 1 and 2 of the drawing. The collars or cam portions 27 of the adjusting bolts which are associated with the stops upon the outer or right-hand side of the plate 13, referring to Figure 1, operate within openings of corresponding size provided in the stops, as best shown in Figure 4, while the threaded shanks of these bolts extend through smaller holes in the support 13; from which it follows that upon loosening the nuts 30 of the bolts the same may be rotated by means of a screw driver inserted in their slotted ends and the positions of the stops 22 changed to properly adjust the outer or right-hand brake band, after which and upon tightening the nuts the stops may be held in their adjusted positions.

Figure 5:
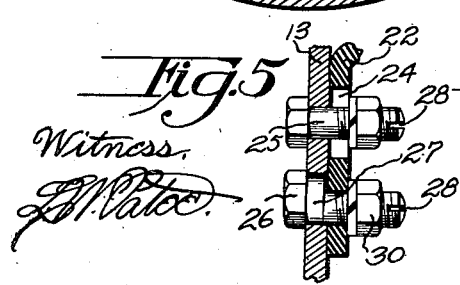
Figure 5 is a similar view upon a plane indicated by the line 5—5, Figure 3.

The collars or cams of the adjusting bolts which are associated with the stops upon the inner or left-hand side of the plate 13 fit within openings provided for them in the said plate, as shown in Figure 5, while the threaded shanks of these last mentioned bolts extend through holes in the innermost stop members; from which it follows that these last mentioned stops may be adjusted upon loosening the nuts of the bolts and rotating the bolts by means of a screw driver inserted into the slot at the extremity of the shank.

It therefore follows that the stops upon both sides of the supporting member or plate 13 may be moved inward or outward and the brake bands supported by said stops properly adjusted relative to the brake drum without disassembling the parts, and from a position at the inner or open side of the brake drum; both the bolts which adjust the stops and those which clamp the stops in place being prevented from rotating by a screw driver or similar implement while the nuts thereupon are loosened to permit the adjustment of the stops and tightened after the stops have been properly positioned.

In adjusting the brake bands, or either one of them, a screw driver, or similar holding implement, is inserted into the slotted end of one of the bolts associated with the stops of the band which it is desired to tighten and the nut upon the threaded end of the bolt thus held is loosened. The screw driver is then rotated to the required extent, thereby rotating the bolt and forcing the stop with which it cooperates outward and against the inner periphery of its associated band. After the stop has been forced out s iciently by the eccentric carried by a bolt cooperating either with the supporting member or with a stop, according to which brake band is being adjusted, the nut is tightened while still preventing the bolt being held from rotating, thus securing the stop in its new position. It will be appreciated that this operation is ordinarily repeated with each of the stops for a given band, each band having four stops cooperating therewith in the embodiment of my invention illustrated, although it may sometimes happen that not all the stops have to be adjusted in order to adjust the periphery of the brake band relative to the interior of the drum with which it cooperates.

Having thus described and explained my invention, I claim and desire to secure by Letters Patent:

1. In brake mechanism of the class described, a brake drum; a non-rotatable supporting disc within and of approximately the same diameter as the interior of said drum; two brake bands located one upon each side of said supporting disc; means for moving said brake bands into frictional engagement with the interior of said brake drum; a plurality of stops carried by said supporting disc and arranged some upon one and others upon the other side thereof, and against which said brake bands rest when in their off positions; and a plurality of adjusting devices all operable from one and the same side of said supporting disc for adjusting said stops to thereby vary the positions of the peripheries of said brake bands relative to the internal surface of said brake drum.

2. In brake mechanism of the class described, a brake drum; a supporting disc located within said brake drum; a brake band; means carried by said supporting disc for preventing rotary motion of said brake band; means for forcing said brake band into frictional engagement with the interior surface of said brake drum; a plurality of stops carried by said supporting disc and against which said brake band rests when in its off position; a cam associated with each of said stops and which cam is rotatable about an axis substantially perpendicular to said supporting disc, to thereby vary the position of the stop with which it is associated; and means for securing said stops in their adjusted position.

3. In brake mechanism of the class described, a brake drum; a supporting disc located within said brake drum; a brake band; means carried by said supporting disc for preventing rotary motion of said brake band; means for forcing said brake band into frictional engagement with the interior surface of said brake drum; a plurality of stops carried by said supporting disc and against which said brake band rests when in its off position; and a combined adjusting and fastening bolt associated with each of said stops and rotatable about an axis substantially perpendicular to said supporting disc for adjusting said stop and for securing it in place in its adjusted position.

4. In brake mechanism of the class described, a non-rotatable supporting member; a brake band; means carried by said supporting member for preventing rotary motion of said brake band; means for forcing said brake band into frictional engagement with a brake drum; a plurality of stops carried by said supporting member and against which said brake band rests when in its off position; and a bolt associated with each of said stops for securing the same in place, said bolt having an eccentric collar portion adjacent its head adapted to rotate in an opening in said supporting member to thereby adjust the position of said stop.

5. In brake mechanism of the class described, a non-rotatable supporting member; a brake band; means carried by said supporting member for preventing rotary motion of said brake band; means for forcing said brake band into frictional engagement with a brake drum; a plurality of stops carried by said supporting member and against which said brake band rests when in its off position; a holding bolt associated with each stop and extending through a hole in said supporting member and through a slot in said stop; and an adjusting bolt associated with each stop and having an eccentric collar rotatable in a hole provided for it to thereby effect the adjustment of said stop.

6. In brake mechanism of the class described, a non-rotatable supporting member; a brake band; means carried by said supporting member for preventing rotary motion of said brake band; means for forcing said brake band into frictional engagement with a brake drum; a plurality of stops carried by said supporting member and against which said brake band rests when in its off position; a combined adjusting and holding bolt associated with each of said stops and having a shank portion extending through a hole therein, and a collar eccentric with said shank portion and rotatable within a hole provided in said supporting member, to thereby effect the adjustment of the stop; and a second bolt associated with each stop for clamping the same to said supporting member.

In testimony whereof I affix my signature.

JOHN W. WHITE.